United States Patent [19]
Thompson

[11] Patent Number: 6,139,342
[45] Date of Patent: Oct. 31, 2000

[54] MEDIA JACK WITH SWITCH FOR LAN AND MODEM CONNECTION

[75] Inventor: Curtis D. Thompson, Taylorsville, Utah

[73] Assignee: 3Com Corporation, Santa Clara, Calif.

[21] Appl. No.: 09/183,830

[22] Filed: Oct. 30, 1998

[51] Int. Cl.$^7$ .................................................. H01R 29/00
[52] U.S. Cl. ........................................ 439/188; 439/955
[58] Field of Search .................................. 439/188, 131, 439/676, 946, 946.2, 955

[56] References Cited

U.S. PATENT DOCUMENTS

| | | | |
|---|---|---|---|
| 4,699,443 | 10/1987 | Goodrich et al. | 439/188 |
| 5,547,401 | 8/1996 | Aldous et al. | 439/676 |
| 5,561,727 | 10/1996 | Akita et al. | 385/88 |
| 5,667,388 | 9/1997 | Cottrell | 439/74 |

*Primary Examiner*—Brian Sircus
*Assistant Examiner*—J. F. Duverne

*Attorney, Agent, or Firm*—Workman, Nydegger & Seeley

[57] ABSTRACT

A media jack is provided having an aperture configured to receive a first media plug and a second media plug each of different configuration. A plurality of discrete contact wires extend from the housing into the aperture. Positioned on the side of the housing is a switch arm having a first contact and second contact positioned at the opposing sides thereof. The switch arm is operable between a first position and a second position. In the first position, the switch arm biases in electrical contact with the first contact such that a head of the switch arm is disposed within the aperture of the media plug. In this position, a discrete contact wire communicates with a first electrical pathway including the first contact and switch arm. In the second position, switch arm is manually pushed backwards so that the switch arm is in electrical communication with the second contact. In this configuration, the discrete contact wire is in communication with a second electrical pathway including that switch arm and second contact.

21 Claims, 7 Drawing Sheets

MEDIA JACK WITH SWITCH FOR LAN AND MODEM CONNECTION

BACKGROUND OF THE INVENTION

1. The Field of the Invention

The present invention relates to electrical receptacles, and more specifically, media jacks that are configured to interchangeable receive and electrically couple with two or more media plugs of different configuration.

2. Present State of the Art

Electrical apparatus, such as personal computers and personal information managers, are becoming increasingly dependent upon their ability to electrically communicate or share information with other electrical apparatus. Two important ways in which an isolated electrical apparatus communicates with other systems is by directly coupling with a network system and, where remote access to a system is required, coupling with a modem for access over telephone lines.

To facilitate communication with network systems and modems, many electrical apparatus have been developed with slots for receiving different PC cards. A PC card is a small thin card having a standard size with a connector at one end configured to couple with the electrical apparatus and a connector at the opposing end which is configured to couple with a desired outside line such as a telephone line for coupling with a modem or a network line. Disposed within the PC card is a circuit board providing the necessary circuitry for the electrical apparatus to communication with the outside system. For example, in one type of PC card the circuit board comprises a modem which enables the electrical apparatus to receive and transmit information over telephone lines. In another PC card, the circuit board enables the electrical apparatus to receive and transmit information with a network system over a network cable. This type of PC card is typically called a network or LAN card.

One conventional type of coupler used for connecting a PC card to an exterior line comprises a thin plate which is retractable within the PC card. For modem cards, the plate has an aperture formed therein. A pair of contact wires coupled with the PC card circuit board project from the plate into the aperture. The aperture is configured to receive a conventional telephone plug, commonly known as an RJ-11, such that the two telephone wires, referred to as the tip and ring, connect with the contact wires disposed within the aperture. As such, electrical communication is established between the electrical apparatus and the telephone line.

In contrast to telephone cables which typically have two wires, network cables typically have six to eight wires which are necessary for communicating with the network system. The plug used with network cables, referred to an RJ-45, looks and functions similar to a telephone plug but is larger so as to accommodate the additional wires. Accordingly, the retractable plate on network cards have an enlarged aperture with a plurality of contact wires, typically six to eight, projecting into the aperture. The aperture is configured to receive the network plug such that each of the wire contacts couple with corresponding wires in the network cable.

As discussed above, initially two discrete PC cards, one for modem operation and one for network operation, where developed. Accordingly, depending on the desired type of connection, one or the other of the PC cards were inserted into the electrical apparatus. This configuration had some drawbacks since individuals would necessarily need to carry both cards and then interchange them for their intended use.

In one attempt to overcome this shortcoming, electrical apparatus were formed with two slots so that both cards could be received within the housing of the electrical apparatus. As the demand for smaller and thinner electrical apparatus increased, however, the market drive was to limit the space required for PC cards.

To help minimize space without requiring PC cards to be continually interchanged, a single PC card was developed that contained the electrical circuitry to function both as a modem card and as a network card. Due to size constraints on PC cards, however, the market has been unable to create a PC card which contains all the electrical circuitry for both modem and network operations and which has two discrete retractable plate type couplers for connecting with a telephone plug and network plug. This is because retractable plate type couplers necessarily slide into the PC card and thus take up additional room. Dual modem and network cards have been developed, however, which include a single retractable plate type coupler for use with a telephone plug and a thin elongated socket for coupling with a conventional low profile PC card connector. Although this configuration provides some advantages, the problem arises that an extra adaptor is now required to make the connect between the RJ-45 network plug and the PC card connector. Such adapters add to the complexity of the connection and are often misplaced or forgotten during travel.

OBJECTS AND BRIEF SUMMARY OF THE INVENTION

Accordingly, it is an object of the present invention to provide a single media jack that can selectively couple with two discrete media plugs of different configuration so that each media plug electrically couples with corresponding electrical circuitry.

Another object of the present invention to provide a single media jack that can selectively couple with two discrete media plugs of different configuration without the required use of an adaptor.

Specifically, it is an object of the present invention to provide a media jack that can be coupled with a PC card or other electrical apparatus and which can interchangeably receive a modem plug and a network plug, the media jack being configured to automatically facilitate electrical communication between a select one of the media plugs and the corresponding electrical circuitry simply by inserting the select media plug.

To achieve the foregoing objects, and in accordance with the invention as embodied and broadly described herein, a media jack is provided. In one embodiment, the media jack comprises a substantially flat plate that can be selectively retracted into a PC card or other electrical apparatus. The plate has an aperture formed therein that is configured to interchangeably received a first media plug, such as a RJ-11, and a second media plug, such as an RJ-45. Projecting from the plate into the aperture are a plurality of contact wires. The contact wires are configured such that as a select media plug is disposed within the aperture, one or more of the contact wires electrically communicate with the select media plug.

The media jack is mounted on an electrical apparatus having circuitry which is configured to communicate with the first media plug and separate circuitry which is configured to communicate with the second media plug. Accordingly, the inventive media jack also includes switching means for switching electrical communication of a select contact wire from a first electrical path when the first media plug is positioned within the aperture to a second electrical path when the second media plug is positioned within the aperture. In one embodiment, a moveable switch arm is disposed within a opening formed in a side of the plate. The switch arm is moveable between a first position and a second position. Position on opposing sides of the switch arm are electrical contacts. In the resting first position, the switch arm is biased forward so that the head of the switch arm is disposed within the aperture and the switch arm is in electrical contact with the first contact. A discrete contact wire is in electrical communication with the switch arm and the first contact is in electrical communication with desired circuitry. Accordingly, when the first media plug is disposed within the aperture, the first media plug communicates with the desired circuitry through the discrete contact wire, switch arm, and first contact.

The second media plug is larger than the first media plug. Accordingly, when the second media plug is received within the aperture, the second media plug presses against the head of the switch arm within the aperture, thereby pushing the switch arm outward into its second position. In the second position, the switch arm is in electrical contact with the second contact. The second contact is in communication with the other electrical circuitry. Accordingly, when the second media plug is position within the aperture, the second media plug communicates with the corresponding electrical circuitry through the discrete wire contract, switch arm, and second contact.

The inventive media jack thus enables two discrete media plugs of different configuration to communicate with discrete electrical circuitry simply by being positioned within the aperture of the media plug. As discussed later in great detail, there are a variety of alternative switching and housing configurations along with a variety of different uses for the inventive media jack. One of the unique aspects of the present invention, however, is that the a PC card having both modem and network circuitry thereon can have a single media jack which selectively couples with a telephone plug or network plug without the required use of an adaptor or second connector.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
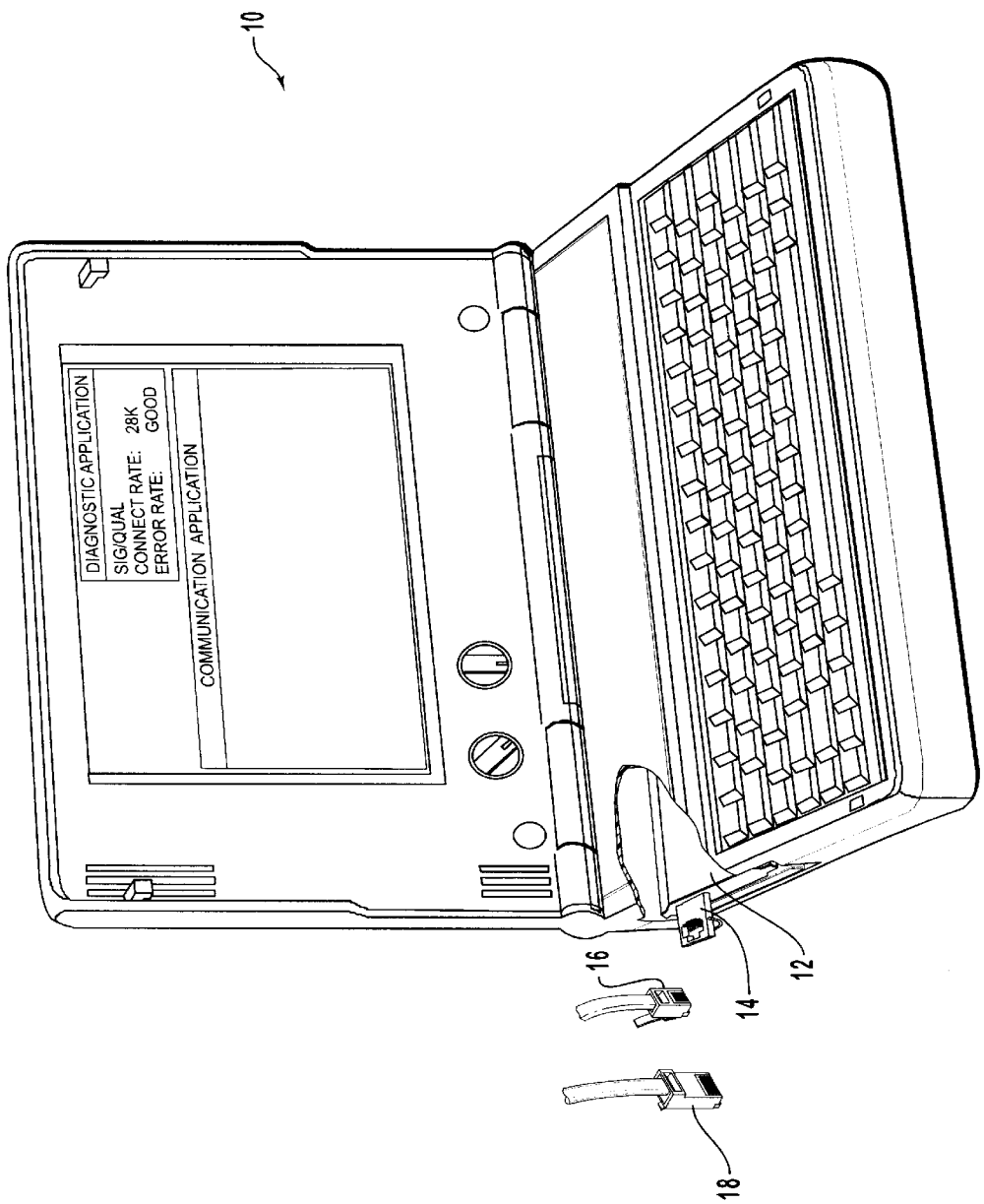
FIG. 1 is a perspective view of a PC card inserted within a computer, the PC card having an inventive media jack configured to interchangeably receive a first media plug and a second media plug of different configurations.

Depicted in FIG. 1 is a computer 10 housing a PC card 12. The term "PC card," as used in the specification and appended claims, is broadly intended to include the various types of cards falling within the Personal Computer Memory Card Internationals Association (PCMCIA) parameters, communication cards falling outside of those standards, and cards which are developed under new standards. Examples of PC cards include modem cards, network cards, memory cards, SCSI cards, cellular phone cards, and combinations thereof.

Secured to PC card 12 is one embodiment of an inventive media jack 14 incorporating features of the present invention. Media jack 14 is configured to interchangeably couple with a first media plug 16 and a second media plug 18, second media plug 18 having a different configuration than first media plug 16. The term "media plug," as used in the specification and appended claims, is broadly intended to include, but not be limited by, media plugs such as those having physical attributes described in F.C.C. part 68, subpart F. Examples of media plugs include the RJ-11, RJ-45, and other RJ-type plugs. For purposes of illustration, first media plug 16 is depicted as comprising a conventional RJ-11 telephone plug while second media plug 18 is depicted as a conventional RJ-45 network plug.

Figure 2:
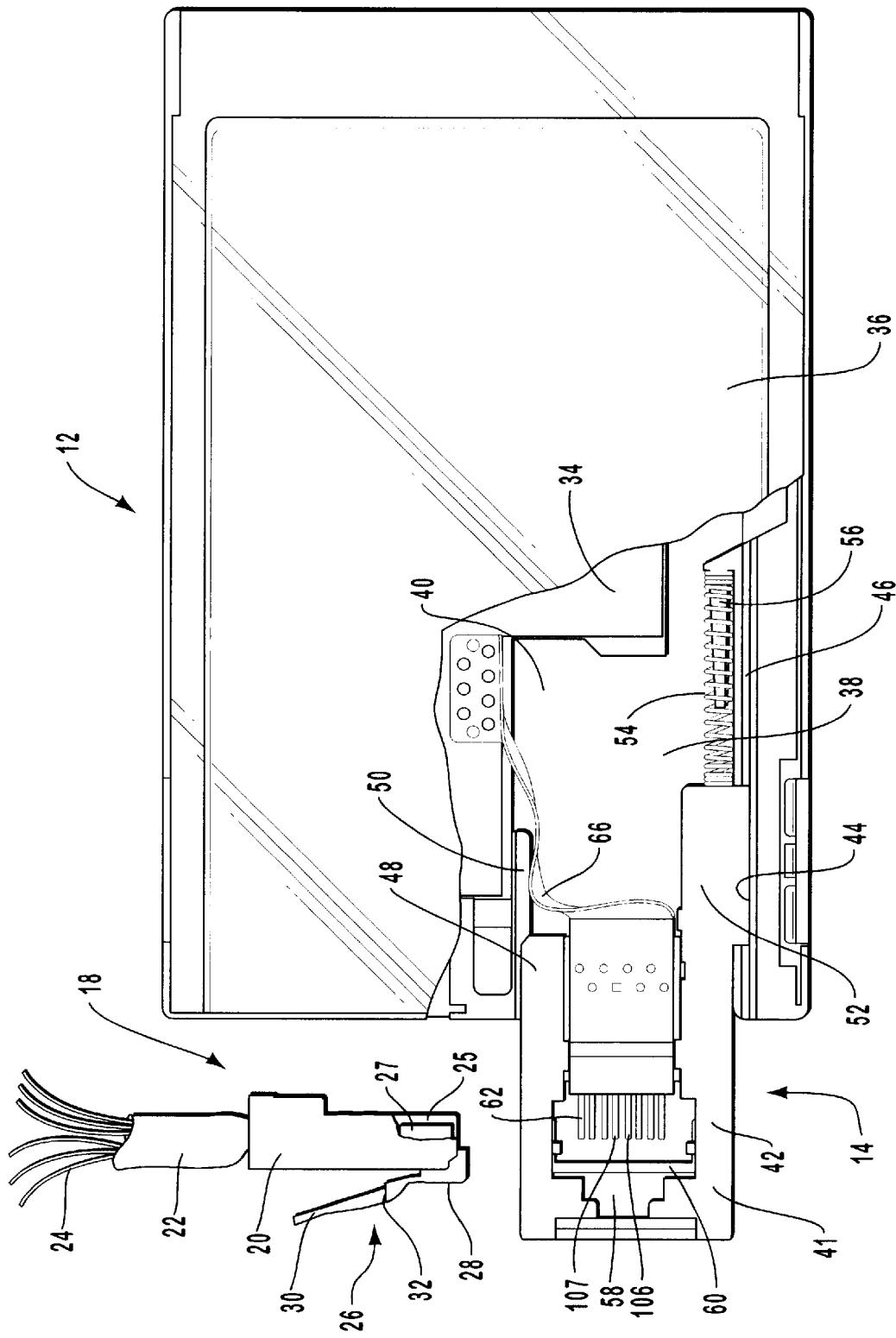
FIG. 2 is a partially cut away top view of the PC card shown in FIG. 1 having the inventive media jack projecting therefrom.

As depicted in FIG. 2, second media plug 18 includes a contact pin block 20 having a cable 22 received within the end thereof. Cable 22 houses a plurality of insulated wires 24. In the present example, cable 22 comprises a network cable which can include six to eight discrete wires. Formed at the lead end of pin block 20 are a plurality of discrete grooves 25. Each groove 25 retains a contact 27 connected with a corresponding wire 24. A biased retention clip 26 is mounted on the side of pin block 20. Retention clip 26 comprises a broad fixed end 28 attached to pin block 20, a narrow free end 30, and a transition notch 32 position therebetween. First media plug 16 has substantially the same components as second media plug 18. The components of first media plug 16 are identified by like reference numerals with the addition of a prime ('). In contrast to second media plug 18, pin block 20' of first media plug 16 is smaller and includes fewer wires 24'. In the present example, cable 22' comprises a telephone cable which can include two to four discrete wires.

Also depicted in FIG. 2, PC card 12 comprises a circuit board 34 bounded by a top cover plate 36 and an opposing bottom cover plate 38. In the present example, circuit board 34 comprises the circuitry necessary to perform both modem operation and network communication. PC cards containing such circuitry are available from 3COM. Formed between cover plates 36 and 38 is a compartment 40 configured to slidably received media jack 14. Media jack 14 comprises a housing 41 which in the present example includes a substantially flat plate 42. Plate 42 has a first side 44 slidably mounted on a rail 46 and an opposing second side 48 slidably mounted on a rail 50. Also formed on first side 44 is a hollow tail 52 configured to receive a spring 54. Spring 54 is mounted on a post 56 and functions to basis plate 42 in the outward position as shown in FIG. 2.

Extending through plate 42 is an aperture 58 discussed below in greater detail. Aperture 58 is configured to interchangeable received both first media plug 16 and second media plug 18. A rotatable harness 60 is mounted to plate 42 and is selectively positioned below aperture 58 so as to prevent media plugs 16 and 18 from completely passing through aperture 58. Projecting into aperture 58 are a plurality of contact wires 62. As discussed below in greater detail, two of contact wires 62 include discrete contact wires 106 and 107. As media plugs 16 and 18 are received within aperture 58, select contact wires 62 are received within corresponding grooves 64 and 64' so as to bias against contacts 27 and effect electrical communication with corresponding wires 24 and 24'. Contact wires 62 are also in electrical communication with a flexible wire ribbon 66 which effects electrical communication with circuit board 34.

Figure 3:
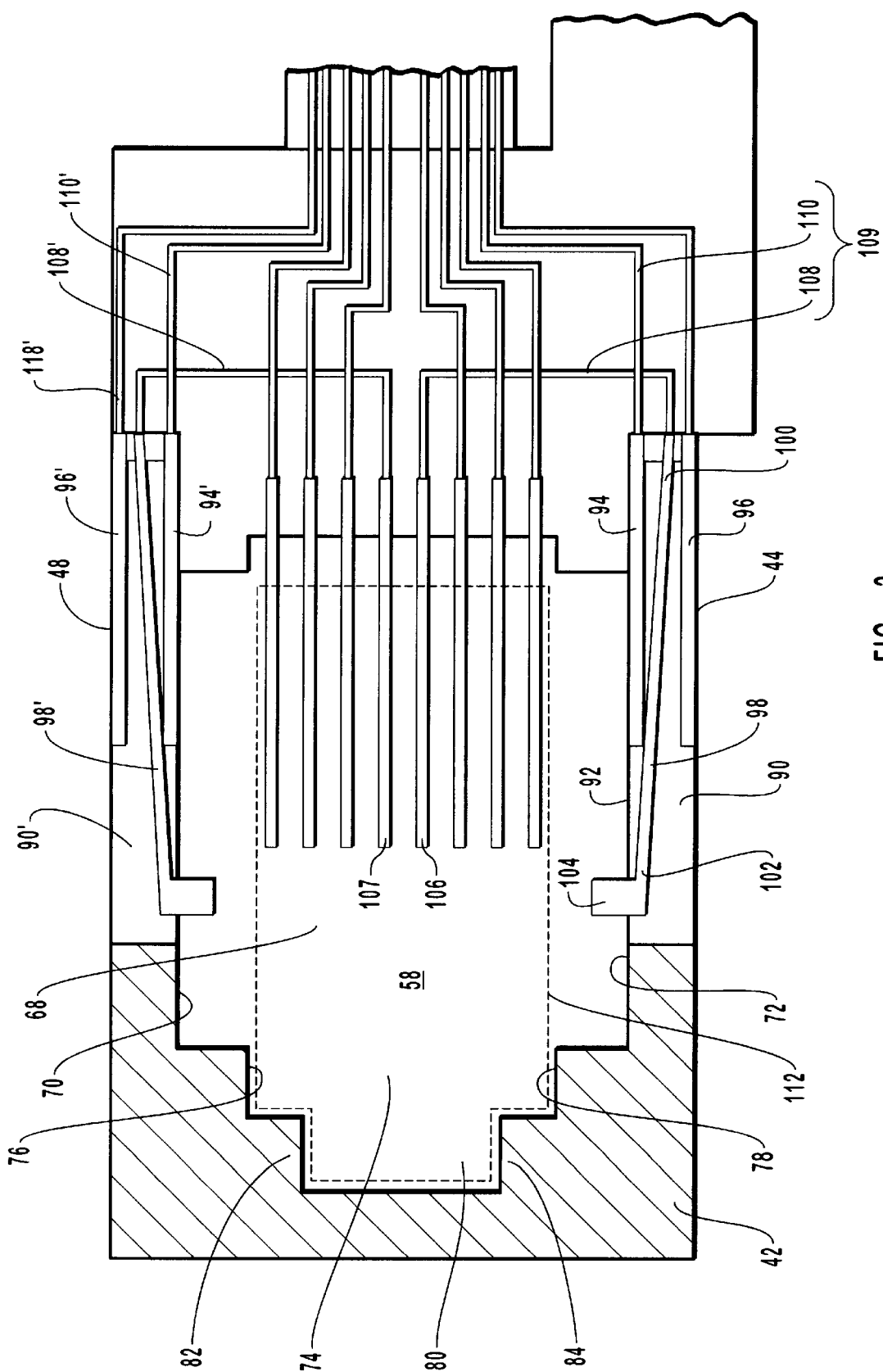
FIG. 3 is a partially cut away top view of the media jack shown in FIG. 2 having a pair of side switches each in a first position.

As depicted in FIG. 3, aperture 58 comprises a main compartment 68 bounded by opposing side walls 70 and 72. Extending off of main compartment 68 is transition slot 74 bounded by opposing sidewalls 76 and 78. Extending from transition slot 74 is a retention slot 80. Retention slot 80 is bounded on opposing sides by shallow stops 82 and 84. When either of media plugs 16 or 18 is inserted within aperture 58, fixed end 28 of retention clip 26 is guided between side walls 76 and 78. As media plugs 16 and 18 are further advanced within aperture 58, retention clip 26 is biased forward by riding against the front face of stops 82 and 84. Once transition notch 32 passes stops 82 and 84, retention clip 26 springs backward such that free end 30 of retention clip 26 is received within retention slot 80 and transition notch 32 of retention clip 26 is locked below stops 82 and 84. To remove media plugs 16 and 18, retention clip 26 is manually pushed forward to unlock transition notch 32 from below stops 82 and 84. Media plugs 16 and 18 can then be freely lifted from aperture 58.

To enable media jack 14 to effect electrical communication with both the modem circuitry and the network circuitry within PC card 12, one or more of contact wires 62 is configured to be able to switch its electrical path depending on which media plug 16 and 18 is received within media jack 14. For example, during modem operation, first media plug 16 is received within aperture 58 so that telephone wires 24' are electrically coupled with discrete contact wires 106 and 107. In turn, contact wires 106 and 107 are electrically coupled with the modem circuitry within PC card 12. In contrast, during connection to a network system, second media plug 18 is received within aperture 58 so that each of the network wires 24 are electrically coupled with each corresponding contact wire 62. In this configuration, each of contact wires 62, including discrete contact wires 106 and 108 are electrically coupled with the network circuitry within PC card 12.

Accordingly, in one embodiment of the present invention, switching means are provided for switching electrical communication of a select contact wire 62 from a first electrical path when first media plug 16 is positioned within aperture 58 to a second electrical path when second media plug 18 is positioned within aperture 58. By way of example and not by limitation, a space 90, as depicted in FIG. 3, is formed in first side 44 of plate 42. Space 90 communicates with aperture 58 through an opening 92. Disposed within space 90 is a metal first contact 94 and a spaced apart metal second contact 96. Also disposed within space 90 is an electrically conductive, flexible switch arm 98. Switch arm 98 has a first end 100 disposed between contacts 94 and 96 and an opposed second end 102. Projecting from second end 102 is an enlarged head 104.

Switch arm 98 is manually moveable between a first position and a second position. In the first position, as depicted in FIG. 3, switch arm 98 is biased forward in a resting position such that switch arm 98 pushes against first contact 94 to make an electrical connection therewith and head 104 is disposed within aperture 58. In this position, contact wire 106 is electrically coupled with the modem circuitry through a first electrical pathway 109. First electrical pathway 109 includes a pathway section 108 extending from electrical contact 106 to switch arm 98 and a pathway section 110 extending from first contact 94 to the modem circuitry. As depicted by dashed lines 112 in FIG. 3, first media plug 16 is configured to be received between sidewalls 76 and 78 when disposed within aperture 58 so as not to contact switch arm 98. As such, electrical communication is maintained between contact wire 106 and first electrical pathway 109 when first media plug 16 is received within aperture 58.

Figure 4:
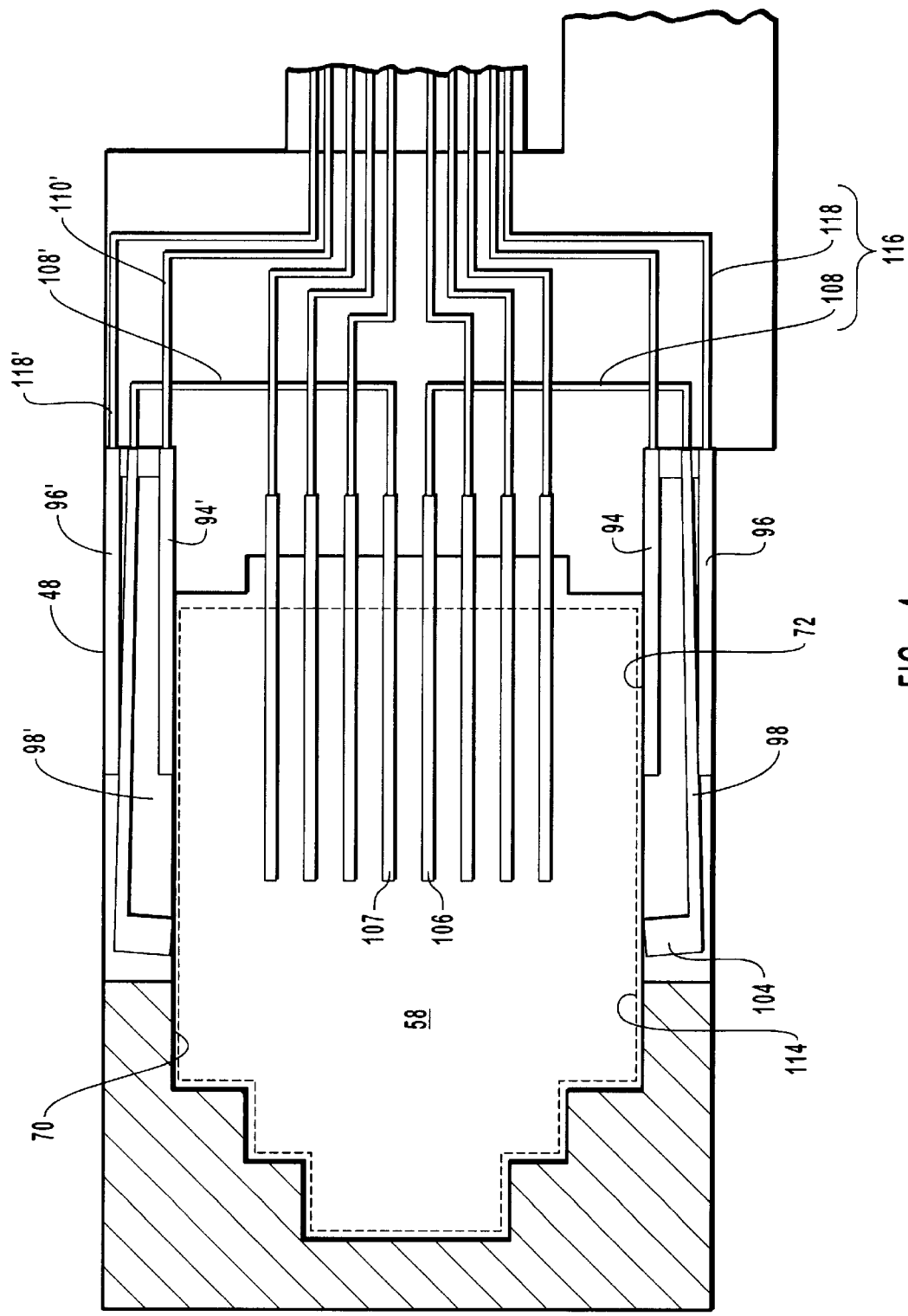
FIG. 4 is a cross sectional top view of the media jack shown in FIG. 3 with each of the side switches in a second position.

As depicted by dashed lines 114 in FIG. 4, second media plug 18 is configured to be received within aperture 58 so as to fit adjacent to side walls 70 and 72. Accordingly, as second media plug 18 is received within aperture 58, media plug 18 pushes against head 104 of switch arm 98 causing switch arm 98 to flex outward into the second position. To assist media plug 18 in pressing against switch arm 98, head 104 can be curved or sloped. In the second position, switch arm 98 is biased against second contact 96 to effect an electrical communication therewith. In this second position, contact wire 106 is in electrical communication with the network circuitry through a second electrical pathway 116. Second electrical pathway 116 includes pathway section 108 extending from electrical contact 106 to switch arm 98 and a pathway section 118 extending from second contact 96 to the network circuitry in PC card 12. Accordingly, as second media plug 18 is received within aperture 58, contact wire 106 automatically switches electrical communication from the modem circuitry to the network circuitry. When second media plug 18 is removed, spring properties of switch arm 98 or, alternatively, a discrete spring, causes switch arm 98 to automatically move back into the first position.

In one embodiment, as previously discussed, switching between the operation of the modem circuitry and the network circuitry requires that both contact wires 106 and 107 be selectively switched between operation of the modem circuitry and network circuitry. To this end, positioned on second side 48 of plate 42 is a switching assembly substantially identical to that discussed above with regard to side 44 of plate 42 but which is electrically coupled with contact wire 107. The elements of the second switching assembly are identified by the same reference characters used for the previously discussed first switching assembly with the addition of a prime ('). For example, as depicted in FIGS. 3 and 4, a switch arm 98' is disposed within a space 90' and is selectively moveable between contact with a metal first contact 94' and a metal second contact 96'. Switch arm 98' communicates with wire contact 107 through a pathway section 108'. First contact 94' is in electrical communication with modem circuitry through pathway section 110'. Likewise, second contact 96' is in electrical communication with the network circuitry through pathway section 118'.

Figure 5:
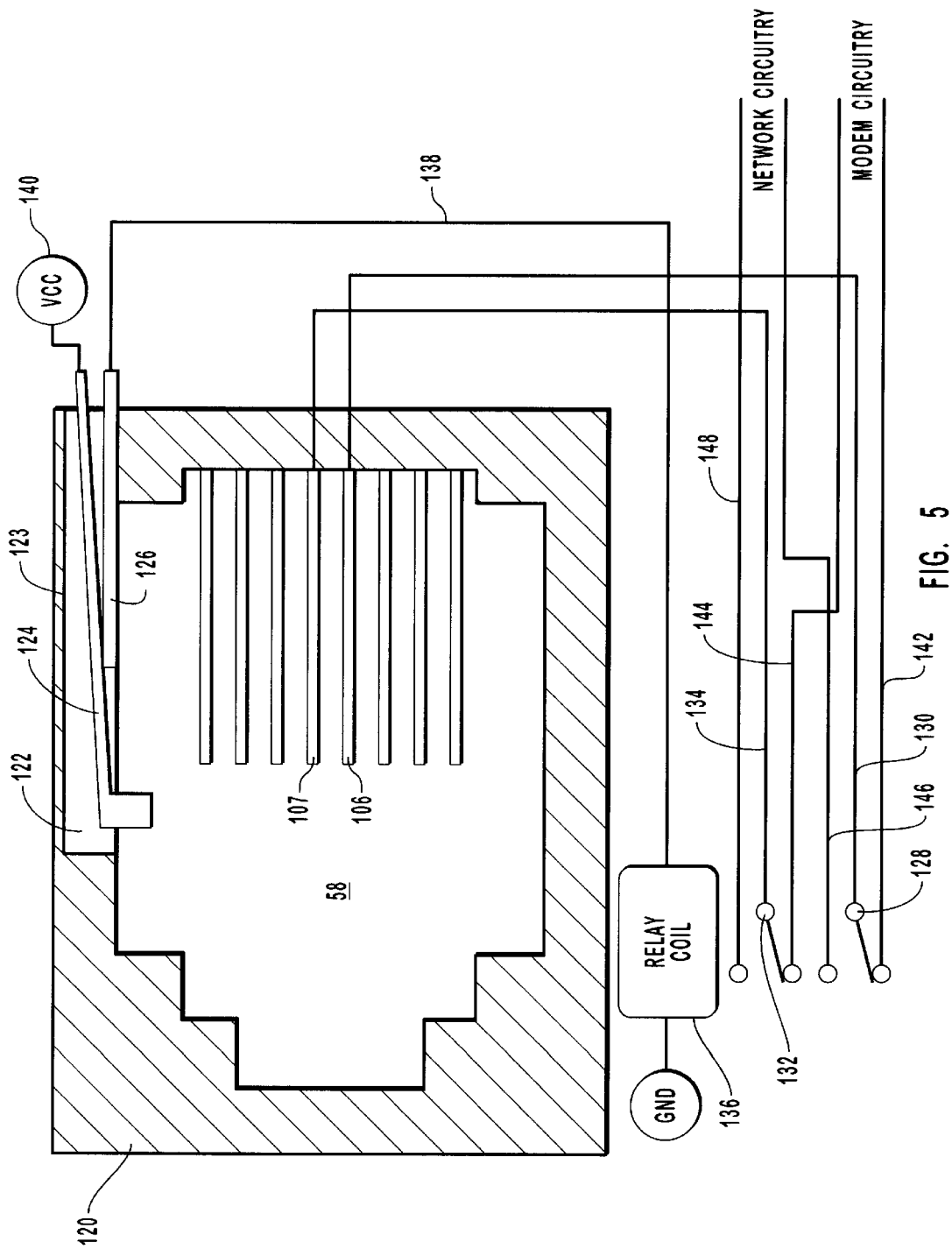
FIG. 5 is a schematic view of the media jack shown in FIG. 2 having an alternative switching design.

Depicted in FIG. 5 is an alternative embodiment to the dual switching assembly depicted in FIGS. 3 and 4. Specifically, depicted in FIG. 5 is an inventive media jack comprising a plate 120 having aperture 58 formed therein and a plurality of contact wires, including discrete contact wires 106 and 107 projecting therein. An opening 122 is formed in a side 123 of plate 120 and a switch arm 124 movably disposed therein. Also disposed within opening 122 is a metal contact 126. Switch arm 124 is moveable between a first position and a second position. In the first position, as depicted in FIG. 5, switch arm 124 biases in a resting position against contact 126 to effect electrical communication therewith. When second media plug 18 is disposed within aperture 58, switch arm 124 is moved to a second position, as previously discussed with regard to FIG. 4, severing electrical communication between switch arm 124 and contact 126.

Contact 126 is coupled with a double-poll double-throw switch which is preferably mounted on circuit board 34. Specifically, contact wire 106 is electrically coupled with a first switch 128 by a pathway section 130. Similarly, contact wire 107 is electrically coupled with a second switch 132 by a pathway section 134. Contact 126 is electrically coupled with a relay coil 136 by a pathway section 138. When switch arm 124 is in the first position, a voltage 140 applied to switch arm 124 energizes relay coil 136 which in turn throws switches 128 and 132 each into a first position. In this first position, pathway section 130 is electrically coupled with a pathway section 142 which in turn is coupled with the modem circuitry. Furthermore, pathway section 134 is electrically coupled with a pathway section 144 which is also electrically coupled with the modem circuitry. Accordingly, when first media plug 16 is inserted within aperture 58, switch arm 124 is retained in the first position resulting in contact wires 106 and 107 being in electrical communication with the modem circuitry.

In contacts, when second media plug 18 is inserted within aperture 58, switch arm 124 is moved into its second position which severs the electrical contact between switch arm 124 and contact 126. As such, relay coil 136 is not energized and switches 128 and 132 are each moved into a section position. In the second position, pathway section 130 is in electrical communication with a pathway section 146 that communicates with the network circuitry and pathway section 134 is in electrical communication with a pathway section 148 which is also in communication with the network circuitry. Accordingly, contact wires 106 and 107 are in electrical communication with the network circuitry when second media plug 18 is disposed within aperture 58.

Figure 6:
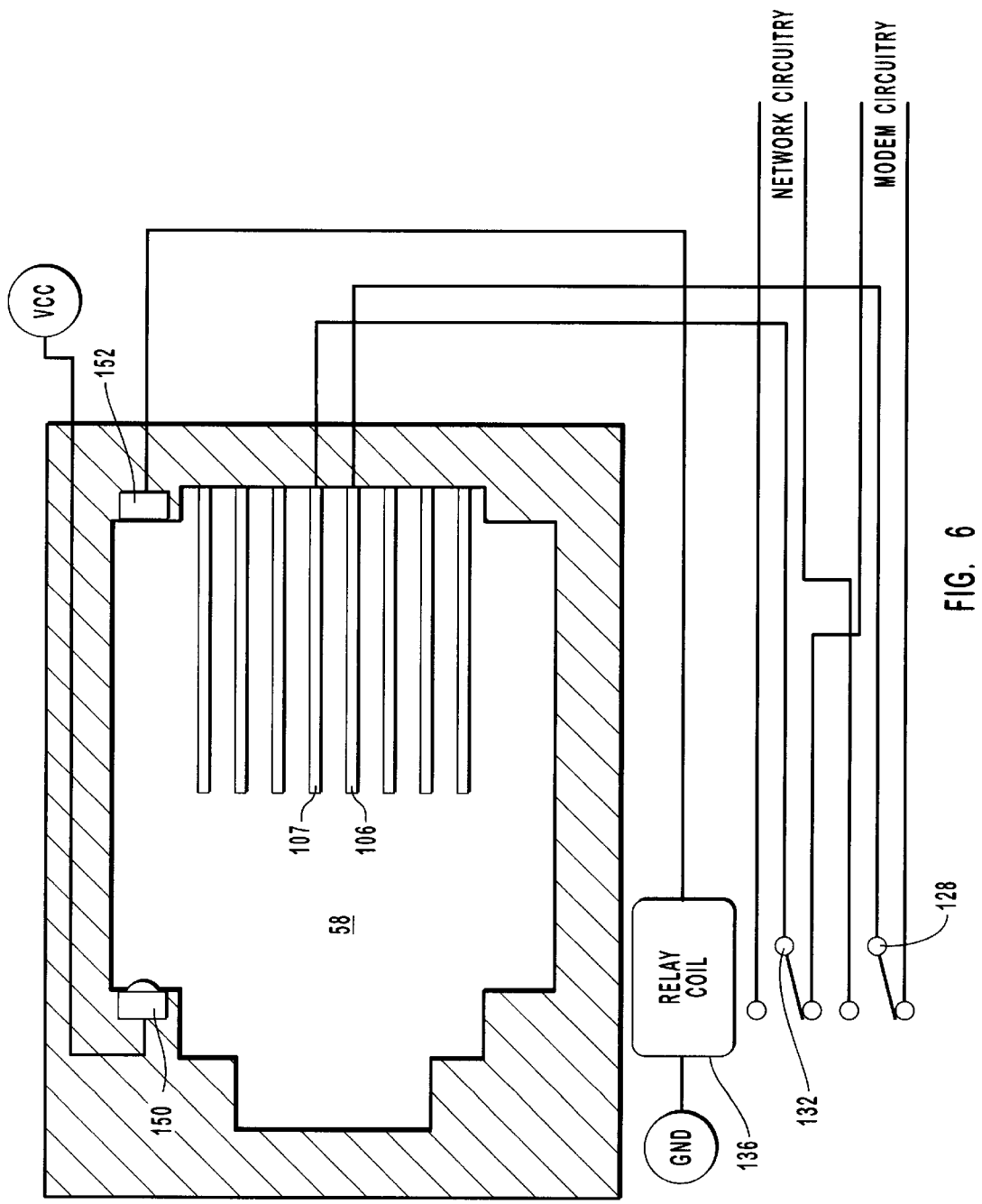
FIG. 6 is a schematic view of the inventive media jack shown in FIG. 2 having yet another alternative switching design.

In yet another alternative embodiment, as depicted in FIG. 6, switch arm 124 and contact 126 are replaced by a light emitting diode (LED) 150 and a receiver 152. The remaining electrical connections are the same as those previously discussed with regard to FIG. 5. LED 150 and receiver 152 are positioned at opposing ends of aperture 58 along the side thereof such that when first media plug 16 is received within aperture 58, the signal transferred between LED 150 and receiver 152 is not obstructed. As result, relay coil 136 is energized and switches 128 and 132 are moved to their first position. In contrast, when second media plug 18 is disposed within aperture 58, media plug 18 obstructs the path between LED 150 and receiver 152 such that the signal is not transferred therebetween. As a result, relay coil 136 is not energized and switches 128 and 132 are moved into their second position. As a result, wire contacts 106 and 107 are switched between electrical communication with the modem circuitry and network circuitry by interchanging first media plug 16 with second media plug 18.

The prior disclosed embodiments are merely examples of switching assemblies. The present invention envisions that there are a variety of well known switching assemblies and configurations that could equally be used to achieve the function of switching between electrical pathways by interchanging different media plugs of different configuration. The present invention also envisions that the inventive media jack can have a variety of alternative configurations. Examples of other mediajack designs which can incorporate the above described switching assemblies are disclosed in U.S. Pat. No. 5,338,210, filed Mar. 31, 1993, which is incorporated herein by specific reference.

Furthermore, the present invention also envisions that the inventive media jack need not be incorporated into a PC card. Rather, the inventive media jack can be incorporated directly onto an electrical apparatus such as a laptop computer, PIM, cellular telephone or other electrical apparatus containing a CPU. Examples of mediajacks which can incorporate the above described switching assemblies and which are directly mounted to electrical apparatus are disclosed in U.S. patent application Ser. No. 08/976,819, filed Nov. 24, 1997, which is incorporated herein by specific reference.

Figure 7:
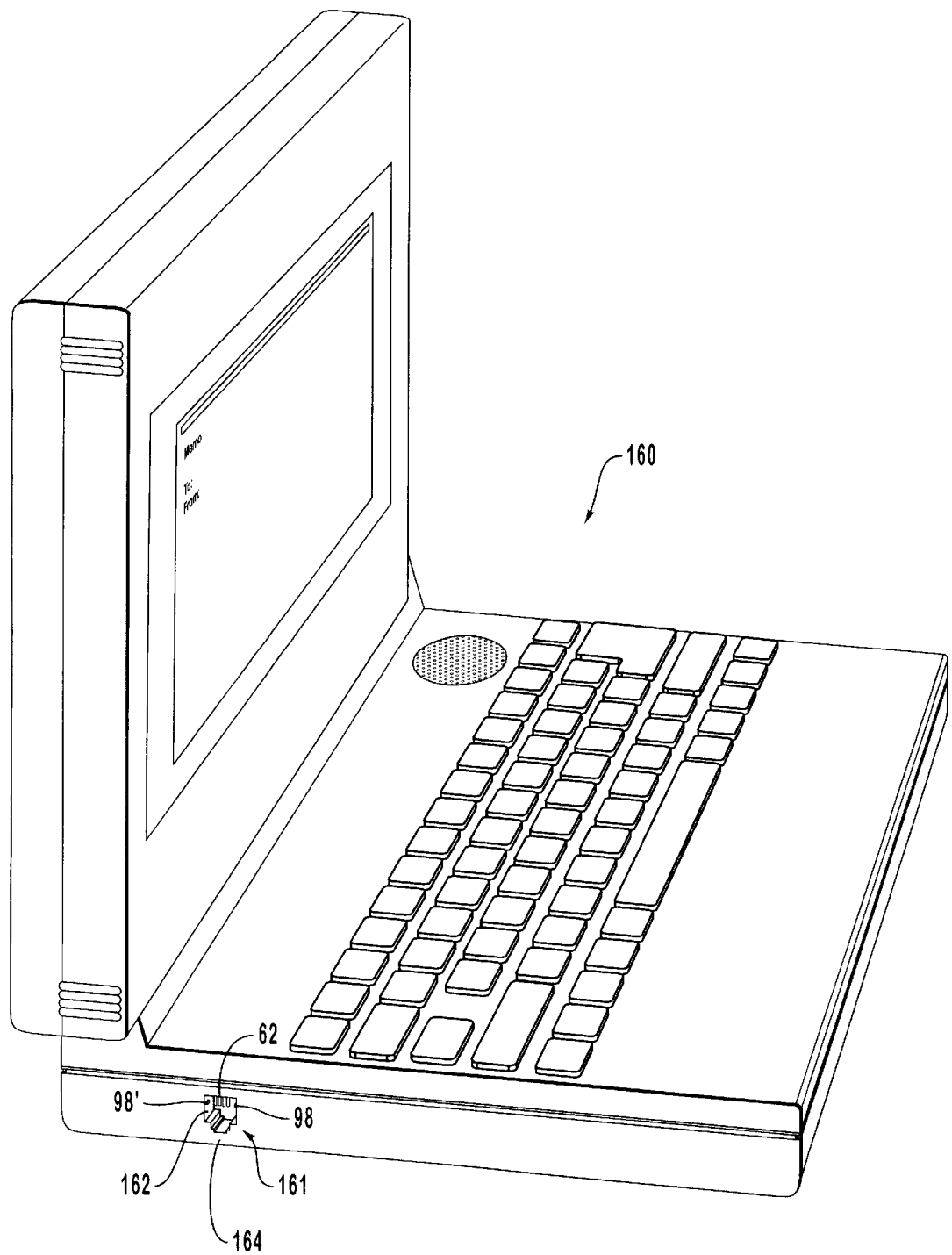
FIG. 7 is a perspective view of an electrical apparatus having an alternative design of the inventive media jack positioned on the side thereof.

Finally, the present invention also envisions that the inventive media jack need not comprise a flat plate. For example, depicted in FIG. 7 is an electrical apparatus 160 having an inventive media jack 161 formed thereon. Media jack 161 includes an aperture 162 in the form of a socket being bounded by a housing 164. In this example, housing 164 is integral with the cover for electrical apparatus 160 but could alternatively be a discrete element. Aperture 162 is formed having substantially the same configuration as aperture 58 previously discussed with regard to FIGS. 2–4. Switch arms 98 and 98' arm formed in the sides thereof in substantially the same manner as previously discussed with regard to FIGS. 3 and 4. Alternatively, the other discussed switching assemblies can also be used. Contact wires 62 are disposed within aperture 162 and can be coupled with either a circuit board disposed within electrical apparatus 160 or can be electrically coupled with a PC card separately disposed within electrical apparatus 160. As a result, contact wires 62 disposed within aperture 162 can be selectively coupled with different electrical circuitry within electrical apparatus 160 by interchangeably positioning first media plug 16 and second media plug 18 within aperture 162.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A retractable media jack configured to interchangeably electrically couple with a first media plug and a second media plug, the first and second media plugs being of different configurations, the media jack comprising:

(a) a retractable substantially flat housing having an aperture formed therein, the aperture being configured to interchangeably receive the first media plug and the second media plug, the first and second media plugs having standardized profile configurations;

(b) a contact wire projecting from the housing in substantially the same plane as the housing into the aperture, the contact wire being in electrical communication with a first electrical path when the first media plug is disposed within the aperture; and (c) switching means being physically exposed to the aperture of the housing for switching electrical communication of the contact wire from the first electrical path to a second electrical path when the second media plug is positioned within the aperture, said switching electrical communication occurring in response to said standardized profile configuration of said second media plug.

2. A media jack as recited in claim 1, wherein the housing comprises a substantially flat plate having the aperture extending therethrough.

3. A media jack as recited in claim 1, wherein the aperture comprises a closed ended socket.

4. A media jack as recited in claim 1, further comprising a plurality of contact wires projecting into the aperture.

5. A media jack as recited in claim 1, wherein the switching means comprises a movable switch arm at least partially disposed within the aperture.

6. A media jack as recited in claim 1, wherein the switching means comprises the switch arm being electrically coupled with a double-through, double-pole switch.

7. A media jack as recited in claim 1, wherein the switching means comprises a LED and receiver positioned on opposing sides of the aperture.

8. A retractable media jack comprising:

(a) a retractable substantially flat housing having an aperture formed therein, the aperture being configured to receive an electrical media plug, the first and second media plugs having standardized profile configurations;

(b) a contact wire projecting from the housing in substantially the same plane as the housing into the aperture, and (c) a switch comprising a movable switch arm having a head at least partially disposed within the aperture, the arm being manually movable between a first position which places the contact wire in communication with a first electrical pathway and a second position which places the contact wire in communication with a second electrical pathway, said switch being manually movable in response to said standardized profile configuration of said second media plug.

9. A media jack as recited in claim 8, wherein the switch further comprises an electrical contact positioned adjacent to the switch, the switch arm biasing against the electrical contact when the switch arm is in the first position.

10. A media jack as recited in claim 9, wherein the electrical contact is coupled with a relay coil.

11. A media jack as recited in claim 8, wherein the aperture is configured to selectively receive an RJ-11 plug and an RJ-45 plug.

12. A media jack as recited in claim 8, wherein the housing comprises a substantially flat plate having the aperture extending therethrough.

13. A media jack as recited in claim 8, wherein the aperture comprises a closed ended socket.

14. A system comprising:

(a) a first media plug;

(b) a second media plug having a configuration different from the first media plug, said first and second media plugs having standardized profile configurations;

(c) an electrical apparatus having an outer cover;

(d) a media jack disposed on the electrical apparatus, the media jack including:

(i) a substantially flat housing having an aperture formed thereon, the aperture being configured to interchangeably receive the first media plug and the second media plug;

(ii) a contact wire projecting from the housing into alignment with the aperture, the contact wire being in electrical communication with a first electrical path when the first media plug is disposed within the aperture; and (iii) switching means being physically exposed to the aperture in the plate for switching electrical communication of the contact wire from the first electrical path to a second electrical path when the second media plug is positioned within the aperture, the switching electrical communication occuring in response to said standardized profile configuration of said second media plug.

15. A system as recited in claim 14, wherein the housing comprises a plate slidably disposed on the electrical apparatus, the plate being movable between an extended position wherein a portion of the plate is disposed outside of the outer cover and a retracted position wherein the plate is substantially enclosed within the outer cover, the plate having the aperture formed thereon.

16. A system as recited in claim 14, wherein the housing of the media jack is at least partially integrally formed with the outer cover of the electrical apparatus and the aperture comprises a closed ended socket.

17. A system as recited in claim 14, wherein the electrical apparatus comprises a laptop computer.

18. A system as recited in claim 14, wherein the first media plug comprises an RJ-11 plug.

19. A system as recited in claim 14, wherein the switching means comprises a movable switch arm at least partially disposed within the aperture.

20. A PC Card for interchangeably electrically coupling with a first media plug and a second media plug, the first and second media plugs being of different configurations, the PC Card comprising:

(a) a cover comprising a top surface and a bottom surface bounding a compartment therebetween;

(b) a circuit board disposed within the compartment of the cover; and (c) a media jack including:

(i) a plate disposed within the compartment of the cover and being electrically coupled with circuit board, the plate being movable between an extended position wherein a portion of the plate is disposed outside of the cover and a retracted position wherein the plate is substantially enclosed within the cover;

(ii) an aperture extending through the plate, the aperture being configured to interchangeably receive the first media plug and the second media plug;

(iii) a contact wire projecting from the plate into alignment with the aperture, the contact wire being in electrical communication with a first electrical path when the first media plug is disposed within the aperture; and (iv) switching means being physically exposed to the aperture in the plate for switching electrical communication of the contact wire from the first electrical path to a second electrical path when the second media plug is positioned within the aperture.

21. A PC Card as recited in claim 20 wherein the switching means comprises a movable switch arm at least partially disposed within the aperture.

* * * * *